Patented Aug. 17, 1937

2,090,237

UNITED STATES PATENT OFFICE 2,090,237

DERIVATIVES OF 2,4-DIOXO-TETRAHYDRO-PYRIDINE AND PROCESS FOR THE MANUFACTURE OF SAME

Otto Schnider, Basel, Switzerland, assignor to Hoffmann-La Roche Inc., Nutley, N. J., a corporation of New Jersey No Drawing. Application July 14, 1936, Serial No. 90,609. In Germany August 28, 1935

4 Claims. (Cl. 23—42)

By condensing malonic ester with β-amino-crotonic-ester dihydroxy-6-methyl-pyridine-carboxyl-acid-ester is obtained which may be converted in a simple manner into dihydroxy-6-methyl-pyridine (Berichte der Deutschen Chemischen Gesellschaft vol. 31, 1898, page 766 ff.). By the same process and starting from the mono-alkyl-malonic-esters 2,4-dihydroxy-3-alkyl-6-methyl-pyridines are obtained. 2,4-dihydroxy-pyridine has likewise been prepared in a similar manner (Berichte der Deutschen Chemischen Gesellschaft vol. 31, 1898, page 1682 ff.). The diethyl-ether has been prepared by way of the silver salt; attempted alkylation of the nitrogen atom was unsuccessful (Berichte der Deutschen Chemischen Gesellschaft vol. 31, 1898, pages 1689 and 1690). If, on the other hand, the alkali salts are alkylated by any of the usual methods, the alkyl group becomes attached to the nitrogen atom. Unlike the starting material the compounds thus obtained are insoluble in alkali.

It has now been found that it is possible to attach two alkyl groups in the 3-position to the pyridine derivatives mentioned, without alkylating the nitrogen, if allyl halides are allowed to react with the alkali salts of 2,4-dihydroxy-pyridine or 2,4-dihydroxy-6-methyl-pyridine or their derivatives mono-alkylated in the 3-position, in aqueous solution in the presence of copper or copper compounds. Instead of allyl-halides their derivatives substituted in the 2-position (bromo-allyl-bromide or methyl-allyl-chloride) may also be used.

The starting compounds probably react according to the following 4 tautomeric formulae:

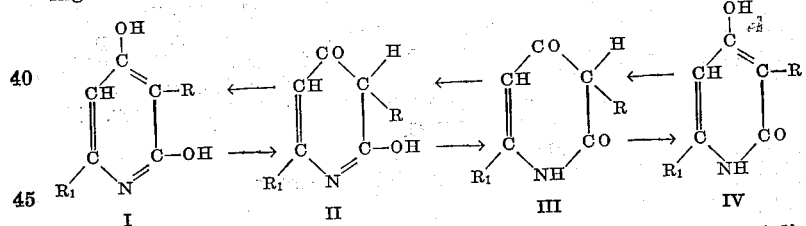

In these formulae R represents hydrogen or alkyl, R₁ hydrogen or methyl.

The new compounds cannot, like the starting materials used, be designated as derivatives of di-hydroxy-pyridine; they must be hydroxy-oxo- or still more likely dioxo-compounds, that is to say the substituents must occupy the position shown in Formulae II and III. They are soluble in alkalis, but also in strong acids; their solutions produce no colouration with ferric chloride. By catalytic hydrogenation the unsaturated alkyl radicles are converted into saturated radicles. They are readily crystallizable compounds of rather low melting point. The simple representatives of this group of compounds may be distilled under reduced pressure without decomposition. All of these compounds are odourless. They are to be used for therapeutical purposes as they have a soporific action, some of them even in very small doses.

Example 1

111 parts by weight of 2,4-dihydroxy-pyridine are dissolved in 600 parts by weight of water by the addition of 129 parts by weight of a 31% sodium hydroxide solution. 121 parts by weight of allyl bromide and 0.5 part by weight of copper powder are then added with thorough stirring. After about half an hour and after slight evolution of heat the mixture becomes neutral. A further 129 parts by weight of 31% sodium hydroxide solution and 121 parts by weight of allyl-bromide are added, whereby further heat is evolved. The reaction is terminated after about 20 minutes. After cooling the precipitated 2,4-dioxo-3,3-diallyl-tetrahydro-pyridine is filtered off, dried and distilled under strongly reduced pressure. The distillate is crystallized from benzene with addition of petroleum ether. It forms colourless crystals melting at 81–82° C. The boiling point lies between 208 and 210° C. under 14 mm. pressure. The compound is readily soluble in organic solvents, but in petroleum ether and in water it is only slightly soluble. By suitable catalytic hydrogenation the corresponding dipropyl compound melting at 92–93° C. is obtained.

Example 2

167 parts by weight of 2,4-dihydroxy-3-n-propyl-6-methyl-pyridine are dissolved in 1000 parts by volume of n-sodium hydroxide solution and quickly stirred. Then 121 parts by weight of allyl bromide and a solution of 1.5 parts by weight of copper sulphate in 15 parts by weight of water are added. There is a slight evolution of heat and the conversion is completed in about half an hour without further manipulation. The product is extracted with 500 parts by weight of benzene, the benzene layer removed and distilled. The 2,4-dioxo-3,3-n-propyl-allyl-6-methyl-tetrahydro-pyridine distils under 14 mm. pressure at 213–215° C. The distillate solidifies and may be recrystallized from petroleum ether; it melts at 73–74° C.

Example 3

To a solution of 125 parts by weight of 2,4-dihydroxy-6-methyl-pyridine in 955 parts by weight of 8.4% sodium hydroxide solution 245 parts by weight of allyl bromide and 0.5 part by weight of copper powder are added while continually stirring. The conversion is complete when the mixture is neutral. The precipitated 2,4-dioxo-3,3-diallyl-6-methyl-tetrahydro-pyridine is separated from the liquid and may be obtained in a perfectly pure state after distilling under reduced pressure (boiling point 208–210° C. under 14 mm. pressure) by recrystallization from dibutyl ether. It melts at 84–85° C. By suitable catalytic hydrogenation the corresponding dipropyl compound melting at 104° C. is obtained.

Example 4

129 parts by weight of 31% sodium hydroxide solution are diluted with 1000 parts by weight of water and 167 parts by weight of 2,4-dihydroxy-3-n-propyl-6-methyl-pyridine are dissolved therein. 200 parts by weight of bromo-allyl-bromide and 1 part by weight of copper powder are then added and the product is heated for about 4 hours to 50–60° C. with continuous stirring until the mixture becomes neutral. The 2,4-dioxo-3,3-β-bromo-allyl-n-propyl-tetrahydro-pyridine is separated from the liquid and may be purified by dissolving in dilute alkali, precipitating with carbon dioxide and crystallizing from petroleum ether. It melts at 123–124° C.

Example 5

153 parts by weight of 2,4-dihydroxy-3-ethyl-6-methyl-pyridine are dissolved in an equivalent of n-sodium hydroxide and thoroughly stirred with 91 parts by weight of isobutylene chloride (β-methyl-allyl-chloride) and 0.5 part by weight of copper powder for 3 hours at about 40° C. The 2,4-dioxo-3,3-ethyl-isobutenyl-6-methyl-tetrahydro-pyridine thus obtained is separated and purified in the manner described in Example 1. It melts at 100–101° C.

Example 6

To a solution of 125 parts by weight of 2,4-dihydroxy-6-methyl-pyridine in 1100 parts by weight of water containing 40 parts by weight of sodium hydroxide, 0.7 part by weight of copper acetate and 121 parts by weight of allyl bromide are added while thoroughly stirring. When the reaction which is accompanied by slight evolution of heat, is complete, 116 parts by weight of 34.5% sodium hydroxide and again 121 parts by weight of allyl bromide are added with continued stirring. Further allylation occurs with evolution of heat. After about an hour the precipitated 2,4-dioxo-3,3-diallyl-6-methyl-tetrahydro-pyridine may be purified in the manner described in Example 3.

Example 7

209 parts by weight of 2,4-dihydroxy-3-n-hexyl-6-methyl-tetrahydro-pyridine are dissolved in 1000 parts by volume of n-potassium hydroxide. To the stirred solution 0.5 part by weight of copper-bronze and 121 parts by weight of allyl bromide are added. Reaction sets in with slight evolution of heat. When the solution has become neutral, the precipitated oil is taken up in benzene and after the benzene has been driven off the 2,4-dioxo-3,3-n-hexyl-allyl-6-methyl-tetrahydro-pyridine remains as an oil and is distilled in vacuo. It boils under 13 mm. pressure at 231–234° C. The distillate slowly solidifies; it melts at 52–53° C.

Example 8

A solution of 165 parts by weight of 2,4-dihydroxy-3-allyl-6-methyl-tetrahydro-pyridine in 1000 parts by weight of water is stirred with 116 parts by weight of 34.5% sodium hydroxide. To the clear solution 0.5 part by weight of copper powder and 76.5 parts by weight of allyl chloride are added while continually stirring. The allylation sets in with slight evolution of heat. The conversion product is identical with the 2,4-dioxo-3,3-diallyl-6-methyl-tetrahydro-pyridine of Example 3.

Example 9

In 1000 parts by volume of n-sodium hydroxide 179 parts by weight of 2,4-dihydroxy-3-isobutenyl-6-methyl-tetrahydro-pyridine are dissolved while stirring. If 0.4 part by weight of copper powder and 121 parts by weight of allyl bromide are added, the conversion immediately sets in. After about three quarters of an hour the completion of the reaction is indicated by neutral reaction. The precipitated 2,4-dioxo-3,3-isobutenyl-allyl-6-methyl-tetrahydro-pyridine is separated from the aqueous liquor and re-dissolved from 60% alcohol. It melts at 144–145° C.

Example 10

153 parts by weight of 2,4-dihydroxy-3-isopropyl-tetrahydro-pyridine are dissolved in 900 parts by weight of water containing 116 parts by weight of 34.5% sodium hydroxide, while thoroughly stirring. Then 121 parts by weight of allyl bromide and 0.5 part by weight of copper powder are added, after which reaction sets in with slight evolution of heat. The 2,4-dioxo-3,3-isopropyl-allyl-tetrahydro-pyridine is taken up in benzene. By extracting the benzene solution with 1000 parts by volume of n-sodium hydroxide the product is again removed from the benzene and precipitated from the filtered clear solution with dilute hydrochloric acid. After drying it is re-dissolved from high-boiling petroleum ether. It melts at 86–87° C.

I claim:

1. Compounds of the formula

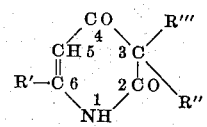

wherein R' is a radical selected from the group consisting of hydrogen and alkyl radicals, and R'' and R''' are alkyl radicals, at least one of which is selected from the group consisting of allyl and substituted allyl radicals, the compounds being soluble in alkalies and strong acids producing in solution no coloration with ferric chloride, and having a soporific action.

2. The 2,4-dioxo-3,3-diallyl-6-methyl-tetrahydro-pyridine melting at 84–85° C., boiling at 208–210° C. under 14 mm. pressure and forming by suitable catalytic hydrogenation the corresponding dipropyl compound melting at 104° C.

3. The process for the manufacture of derivatives of 2,4-dioxo-tetrahydro-pyridine which consists in allowing allyl halides of the general formula $CH_2=CR-CH_2Hal$, in which R is hydrogen, halogen or methyl, to react with the alkali salts of 2,4-dihydroxy-pyridines of the general formula

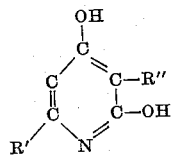

in which R' is hydrogen or methyl, R'' hydrogen or alkyl, in aqueous solution in the presence of copper or copper compounds.

4. The process for the manufacture of 2,4-dioxo-3,3-diallyl-6-methyl-tetrahydro-pyridine which consists in allowing allyl bromide to react with the sodium salt of 2,4-dioxo-6-methyl-pyridine in aqueous solution in the presence of copper powder.

OTTO SCHNIDER.